United States Patent
Minegishi et al.

(10) Patent No.: US 10,375,254 B2
(45) Date of Patent: Aug. 6, 2019

(54) IMAGE FORMING APPARATUS AND RECORDING MEDIUM

(71) Applicant: Konica Minolta, Inc., Tokyo (JP)

(72) Inventors: Natsuko Minegishi, Tokyo (JP); Wataru Watanabe, Tokyo (JP); Hiroshi Morimoto, Tokyo (JP); Keiki Katsumata, Tokyo (JP); Kazuhiro Saito, Aichi (JP); Hiroki Shibata, Tokyo (JP); Daiki Watanabe, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 25 days.

(21) Appl. No.: 15/784,602

(22) Filed: Oct. 16, 2017

(65) Prior Publication Data

US 2018/0115653 A1 Apr. 26, 2018

(30) Foreign Application Priority Data

Oct. 25, 2016 (JP) .................................. 2016-208738

(51) Int. Cl.
*H04N 1/00* (2006.01)
*G03G 15/00* (2006.01)
*G06K 15/12* (2006.01)
*G06T 7/00* (2017.01)

(52) U.S. Cl.
CPC ..... *H04N 1/00005* (2013.01); *G03G 15/5041* (2013.01); *G06K 15/128* (2013.01); *H04N 1/00018* (2013.01); *G06T 7/0004* (2013.01); *G06T 2207/30144* (2013.01); *H04N 1/00185* (2013.01)

(58) Field of Classification Search
None
See application file for complete search history.

(56) References Cited

U.S. PATENT DOCUMENTS

| | | | | |
|---|---|---|---|---|
| 6,359,617 B1 * | 3/2002 | Xiong | ................... | G06T 3/0068 715/848 |
| 7,800,778 B2 * | 9/2010 | Livne | .................. | G06K 15/1261 347/115 |
| 8,297,735 B2 * | 10/2012 | Garcia | ..................... | B41J 2/515 347/37 |

(Continued)

FOREIGN PATENT DOCUMENTS

| | | |
|---|---|---|
| JP | 2004145285 A | 5/2004 |
| JP | 2006264220 A | 10/2006 |

(Continued)

OTHER PUBLICATIONS

Office Action dated Jan. 28, 2019 from the corresponding Chinese Patent Application No. 201710980873.7 and English translation.

*Primary Examiner* — Ted W Barnes
(74) *Attorney, Agent, or Firm* — Lucas & Mercanti, LLP

(57) ABSTRACT

An image forming apparatus includes a plurality of image formers each capable of forming, on a sheet, an overlap image and a non-overlap image, a fixer that fixes, on the sheet, a whole image composed of the overlap images and the non-overlap images, and a hardware processor that controls each of the plurality of image formers such that a difference in image at a boundary between the overlap image and the non-overlap image is reduced in the whole image.

17 Claims, 8 Drawing Sheets

(56) References Cited

U.S. PATENT DOCUMENTS

| | | | |
|---|---|---|---|
| 8,934,133 B2* | 1/2015 | Regelsberger | G06K 15/1868 358/1.2 |
| 2005/0030327 A1* | 2/2005 | Tatsumi | B41J 2/16579 347/13 |
| 2005/0046653 A1* | 3/2005 | Yamazaki | B41J 2/2139 347/15 |
| 2005/0057593 A1* | 3/2005 | Kachi | B41J 11/003 347/14 |
| 2005/0068379 A1* | 3/2005 | Sanada | B41J 2/14274 347/70 |
| 2005/0099441 A1* | 5/2005 | Tatsumi | B41J 2/2103 347/13 |
| 2005/0237575 A1* | 10/2005 | Yamazaki | H04N 1/4052 358/3.03 |
| 2010/0149567 A1* | 6/2010 | Kanazawa | H04N 1/40006 358/1.9 |
| 2012/0274739 A1* | 11/2012 | Li | H04N 5/2624 348/36 |
| 2013/0034312 A1* | 2/2013 | Sudheendra | G06K 9/34 382/284 |
| 2013/0201237 A1* | 8/2013 | Thomson | B41J 3/543 347/14 |
| 2017/0161594 A1* | 6/2017 | Casaldaliga Albisu | B41J 2/2146 |
| 2017/0313062 A1* | 11/2017 | Rubio | B41J 2/2132 |
| 2017/0320341 A1* | 11/2017 | Wander | B41J 15/046 |
| 2017/0334192 A1* | 11/2017 | Iida | B41J 2/01 |
| 2017/0337672 A1* | 11/2017 | Zou | G06T 7/30 |
| 2018/0018546 A1* | 1/2018 | Rubio | G06K 15/107 |
| 2018/0022128 A1* | 1/2018 | Farina Vargas | B41J 2/07 347/5 |
| 2018/0043710 A1* | 2/2018 | Wander | B41J 11/001 |
| 2018/0096487 A1* | 4/2018 | Nash | H04N 5/217 |

FOREIGN PATENT DOCUMENTS

| | | |
|---|---|---|
| JP | 2008200970 A | 9/2008 |
| WO | 2016/074731 A1 | 5/2016 |

* cited by examiner

IMAGE FORMING APPARATUS AND RECORDING MEDIUM

CROSS REFERENCE TO RELATED APPLICATIONS

Japanese Patent Application No. 2016-208738 filed on Oct. 25, 2016, including description, claims, drawings, and abstract the entire disclosure is incorporated herein by reference in its entirety.

BACKGROUND

Technological Field

The present invention relates to an image forming apparatus and a recording medium.

Description of Related Art

In general, an electrophotographic image forming apparatus (such as a printer, a copier, or a fax machine) is configured to irradiate (expose) a charged photoconductor drum (image bearing member) with (to) laser light based on image data to form an electrostatic latent image on the surface of the photoconductor. The electrostatic latent image is then visualized by supplying toner from a developing device to the photoconductor drum on which the electrostatic latent image is formed, whereby a toner image is formed. Further, the toner image is directly or indirectly transferred to a sheet, and then heat and pressure are applied to the sheet at a fixing nip to form a toner image on the sheet.

In such an image forming apparatus, when sheets larger in size than a sheet of SRA3 size, for example, are used for printing, or when entire image forming units are adjusted to a sheet size, distortion in parts of the image forming unit increases, so that image defects, such as density unevenness and the like, tend to occur easily. In addition, it may be even impossible to produce parts having a width corresponding to a large sheet depending on a material and/or a production method employed for parts of the image forming unit.

Accordingly, it is possible that a plurality of image forming units are arranged in the main scanning direction to form a whole image corresponding to a large sheet. For example, Japanese Patent Application Laid-Open No. 2008-200970, for example, discloses a configuration in which a plurality of LED heads are arranged in the main scanning direction. In the technique disclosed in Japanese Patent Application Laid-Open No. 2008-200970, a configuration is disclosed in which timing of light exposure by the LED heads is controlled such that a whole image is formed in which boundaries among images formed by LED heads are contiguous.

SUMMARY

In the configuration in which a plurality of image forming units are arranged in the main scanning direction, however, image densities of images formed by respective image forming units varied from each other due to variations in charge amount of a developing agent. In this case, there has been a problem in that a difference in image density occurs in images formed respectively by the image forming units to thereby cause boundaries between the images to be conspicuous, so that the whole image gives an unnatural impression to a user seeing this image.

An object of the present invention is to provide an image forming apparatus and recording medium capable of forming, using a plurality of image forming units, an image on a large sheet that does not give a user an unnatural impression.

An image forming apparatus in which one aspect of the present invention is reflected in an attempt to at least partly achieve the above-mentioned object includes: a plurality of image formers each capable of forming, on a sheet, an overlap image and a non-overlap image, the overlap images overlapping with each other in a main scanning direction, the non-overlap images not overlapping with each other in the main scanning direction, the main scanning direction being a width direction of the sheet; a fixer that fixes, on the sheet, a whole image composed of the overlap images and the non-overlap images formed by the plurality of image formers; and a hardware processor that controls the plurality of image formers such that differences in images at boundaries between the overlap images and the non-overlap images are reduced in the whole image.

A recording medium in which one aspect of the present invention is reflected in an attempt to at least partly achieve the above-mentioned object is a non-transitory recording medium storing therein a computer-readable program for an image forming apparatus including a plurality of image formers each capable of forming, on a sheet, an overlap image and a non-overlap image, the overlap images overlapping with each other in a main scanning direction, the non-overlap images not overlapping with each other in the main scanning direction, the main scanning direction being a width direction of the sheet; and a fixer that fixes, on the sheet, a whole image composed of the overlap images and the non-overlap images formed by the plurality of image formers. In the recording medium, the program causes a computer in the image forming apparatus to carry out control processing of controlling the plurality of image formers such that differences in image at boundaries between the overlap images and the non-overlap images are reduced in the whole image.

BRIEF DESCRIPTION OF DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

Figure 1:
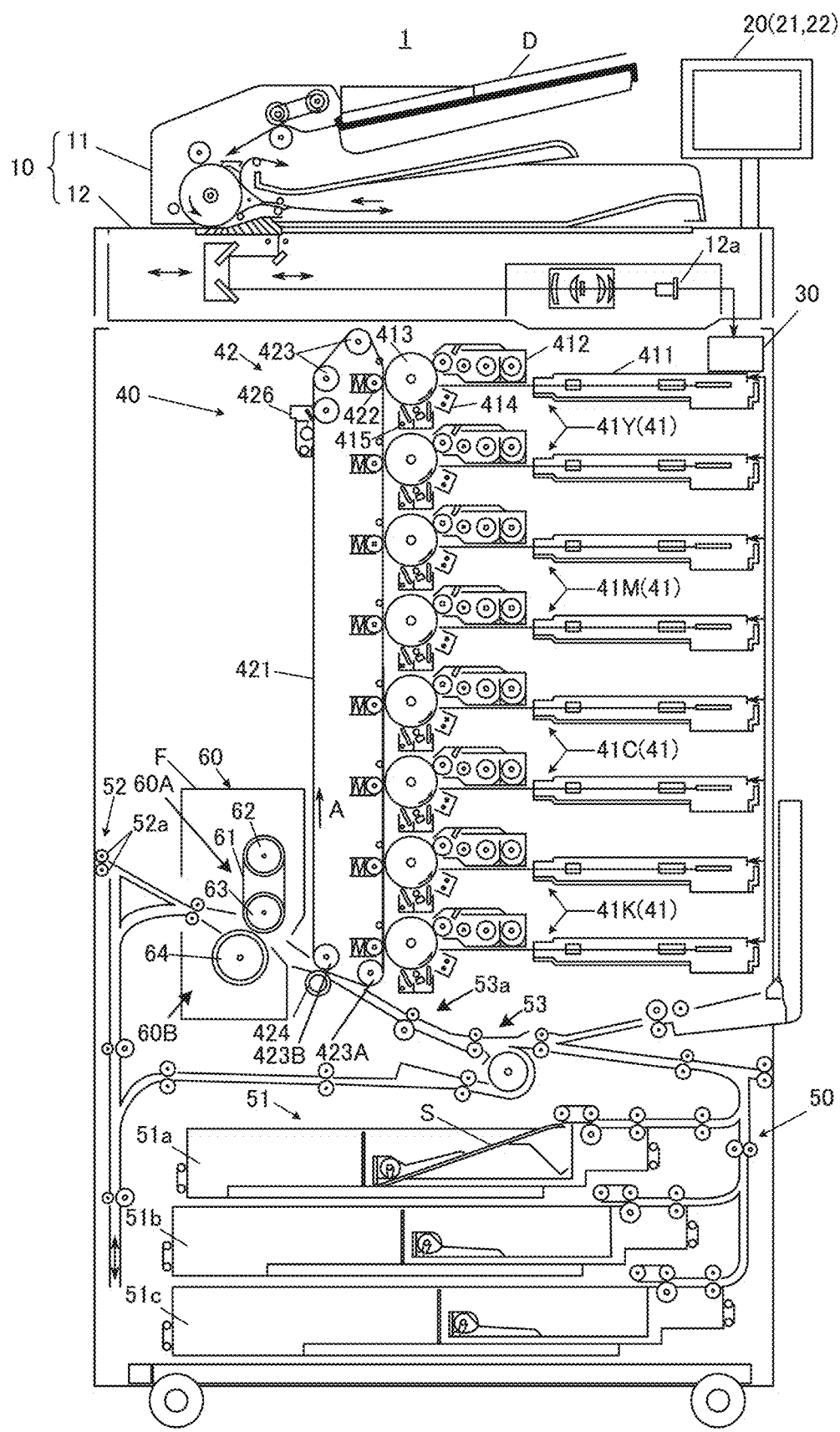
FIG. 1 schematically illustrates an entire configuration of an image forming apparatus according to an embodiment of the present invention.
Figure 2:
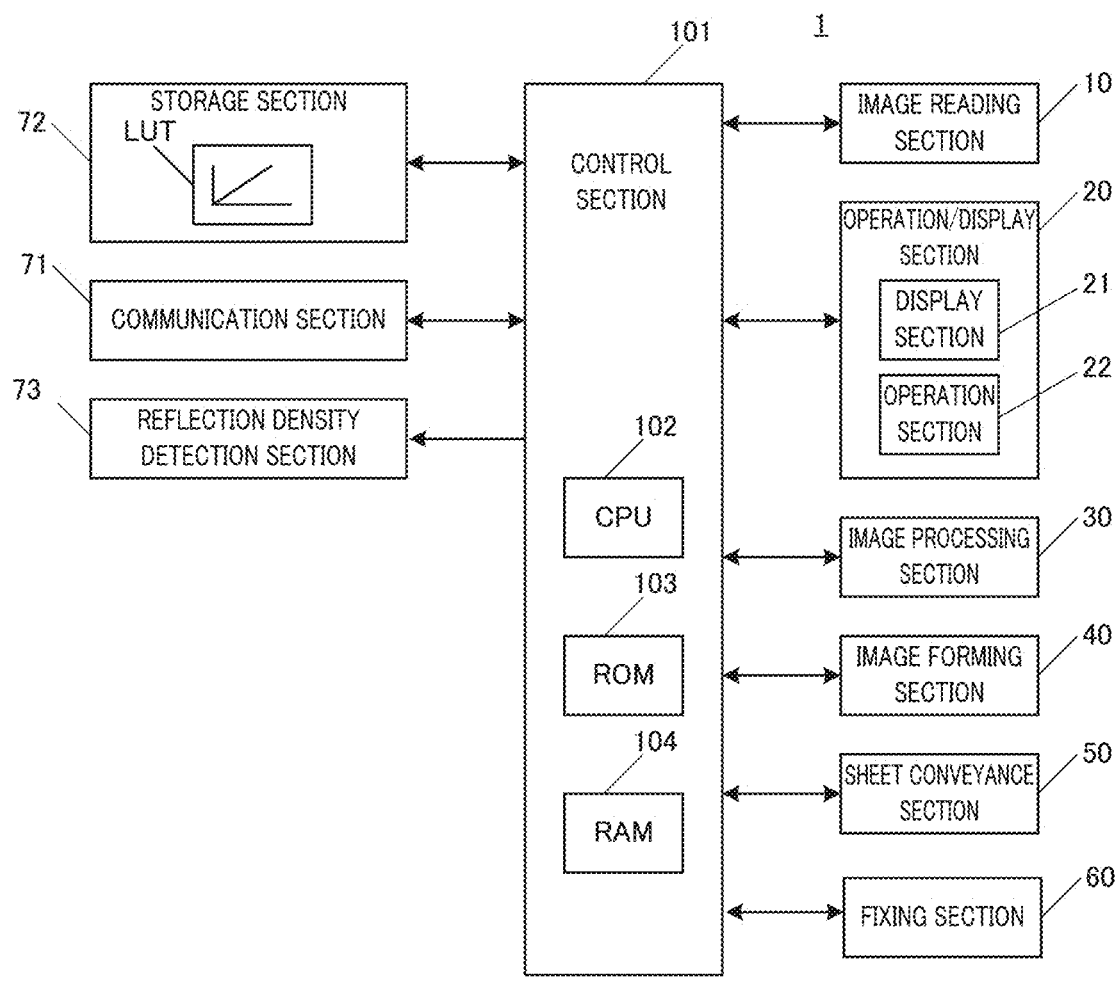
FIG. 2 illustrates a principal part of a control system of the image forming apparatus according to the embodiment of the present invention.

Hereinafter, an embodiment of the invention is described in detail based on the drawings. FIG. 1 schematically illustrates an entire configuration of image forming apparatus 1 according to the embodiment of the present invention. FIG. 2 illustrates a principal part of a control system of image forming apparatus 1 according to the embodiment of the present invention.

Image forming apparatus 1 illustrated in FIG. 1 is a color image forming apparatus of an intermediate transfer system using electrophotographic process technology. That is, image forming apparatus 1 transfers (primary-transfers) toner images of yellow (Y), magenta (M), cyan (C), and black (K) formed on photoconductor drums 413 to intermediate transfer belt 421, and superimposes the toner images of the four colors on one another on intermediate transfer belt 421. Then, image forming apparatus 1 secondary-transfers the resultant image to sheet S sent out from feeding tray units 51a to 51c, thereby forming an image.

A longitudinal tandem system is adopted for image forming apparatus 1. In the longitudinal tandem system, respective photoconductor drums 413 corresponding to the four colors of YMCK are placed in series in the travelling direction (vertical direction) of intermediate transfer belt 421, and the toner images of the four colors are sequentially transferred to intermediate transfer belt 421 in one cycle.

As illustrated in FIG. 2, image forming apparatus 1 includes image reading section 10, operation/display section 20, image processing section 30, image forming section 40, sheet conveyance section 50, fixing section 60, and control section 101.

Control section 101 includes central processing unit (CPU) 102, read only memory (ROM) 103, random access memory (RAM) 104 and the like. CPU 102 reads a program suited to processing contents out of ROM 103, loads the program into RAM 104, and integrally controls an operation of each block of image forming apparatus 1 in cooperation with the loaded program. At this time, CPU 101 refers to various kinds of data stored in storage section 72. Storage section 72 is composed of, for example, a non-volatile semiconductor memory (so-called flash memory) or a hard disk drive.

Control section 101 transmits and receives various data to and from an external apparatus (for example, a personal computer) connected to a communication network such as a local area network (LAN) or a wide area network (WAN), through communication section 71. Control section 101 receives, for example, image data (input image data) transmitted from the external apparatus, and performs control to form an image on sheet S on the basis of the image data. Communication section 71 is composed of, for example, a communication control card such as a LAN card.

As illustrated in FIG. 1, image reading section 10 includes auto document feeder (ADF) 11, document image scanning device 12 (scanner), and the like.

Auto document feeder 11 conveys, with a conveyance mechanism, document D placed on a document tray, to send out document D to document image scanner 12. Auto document feeder 11 makes it possible to successively read at once images (even both sides thereof) of a large number of documents D placed on the document tray.

Document image scanner 12 optically scans a document conveyed from auto document feeder 11 onto a contact glass or a document placed on the contact glass, and images reflected light from the document on a light receiving surface of charge coupled device (CCD) sensor 12a to read the document image. Image reading section 10 generates input image data based on results read by document image scanner 12. The input image data undergo predetermined image processing in image processing section 30.

As illustrated in FIG. 2, operation/display section 20 includes, for example, a liquid crystal display (LCD) provided with a touch panel, and functions as display section 21 and operation section 22. Display section 21 displays various operation screens, image conditions, operating statuses of each function, and/or the like in accordance with display control signals input from control section 101. Operation section 22 equipped with various operation keys, such as a numeric keypad and a start key, receives various input operations by users and outputs operation signals to control section 101.

Image processing section 30 includes a circuit and/or the like that performs digital image processing of input image data in accordance with default settings or user settings. For example, image processing section 30 performs tone correction based on tone correction data (tone correction table) under the control of control section 101. Moreover, image processing section 30 performs various correction processing, such as color correction or shading correction, in addition to tone correction, and, compression processing, and the like of input image data. Image forming section 40 is controlled on the basis of the image data that has been subjected to these processes.

As illustrated in FIG. 1, image forming section 40 includes: image forming units 41Y, 41M, 41C, and 41K that form images of colored toners of a Y component, an M component, a C component, and a K component on the basis of the input image data; intermediate transfer unit 42; and the like. Intermediate transfer unit 42 corresponds to the "transferrer" of the present invention.

Image forming units 41Y, 41M, 41C, and 41K for the Y component, the M component, the C component, and the K component have similar configurations. For convenience in illustration and description, common elements are denoted by the same reference signs and such reference signs are accompanied by Y, M, C, or K when they are to be distinguished. In FIG. 1, reference signs are given to only the elements of image forming unit 41Y for the Y component, and reference signs are omitted for the elements of other image forming units 41M, 41C, and 41K.

Image forming unit 41 includes exposing device 411, developing device 412, photoconductor drum 413, charging device 414, drum cleaning device 415 and the like. Exposing device 411 corresponds to the "exposer" of the present invention. Developing device 412 corresponds to the "developer" of the present invention. Photoconductor drum 413 corresponds to the "image bearing member" of the present invention.

Photoconductor drum 413 is an organic photoconductor including, for example, a drum-shaped metallic base including the outer peripheral surface on which a photosensitive layer made of a resin containing an organic photoconductive material is formed.

Control section 101 causes photoconductor drum 413 to rotate at a constant peripheral velocity by control of a driving current supplied to a driving motor (not illustrated) that causes photoconductor drum 413 to rotate.

Charging device 414 is an electrostatic charger, for example, and evenly and negatively charges the surface of photoconductor drum 413 having photoconductivity by generating corona discharge.

Exposing device 411 is composed of, for example, a semiconductor laser, and configured to irradiate photoconductor drum 413 with laser light corresponding to the image of each color component. As a result, electrostatic latent images of respective color components are formed in an imaging area irradiated with laser light on the surface of photoconductor drum 413 because of potential differences from a background region.

Developing device 412 is a developing device of a two-component counter-rotation type, and attaches developing agents of respective color components to the surface of photoconductor drums 413, and visualizes the electrostatic latent image to form a toner image.

A direct-current developing bias of the polarity identical to the charge polarity of charging device 414, or a developing bias in which a direct current voltage of the polarity identical to the charge polarity of charging device 414 is superposed on an alternating current voltage is applied to developing device 412, for example. As a result, reversal development in which toner adheres to the electrostatic latent image formed by exposing device 411 is effected.

Drum cleaning device 415 includes a platelike drum cleaning blade made of an elastic body and is brought into contact with the surface of photoconductor drum 413, and removes transfer residual toner that remains on the surface of photoconductor drum 413 without transferred to intermediate transfer belt 421.

In addition, in the present embodiment, two image forming units 41 are disposed for each color of developing agents so that image forming processing of sheet S larger in size than a sheet of SRA3 size, for example, is enabled.

Figure 3:
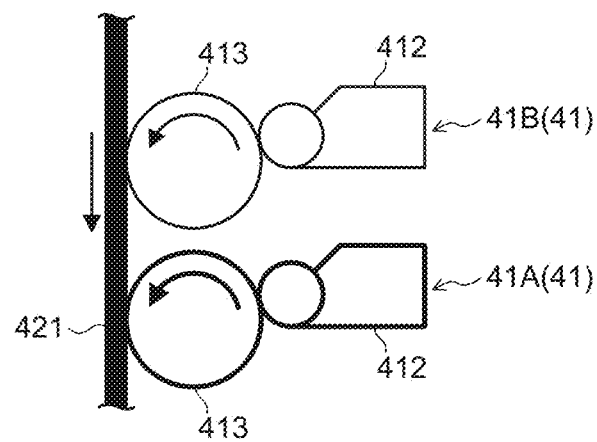
FIG. 3 is an enlarged view of a plurality of image forming units corresponding to the same color.
Figure 4:
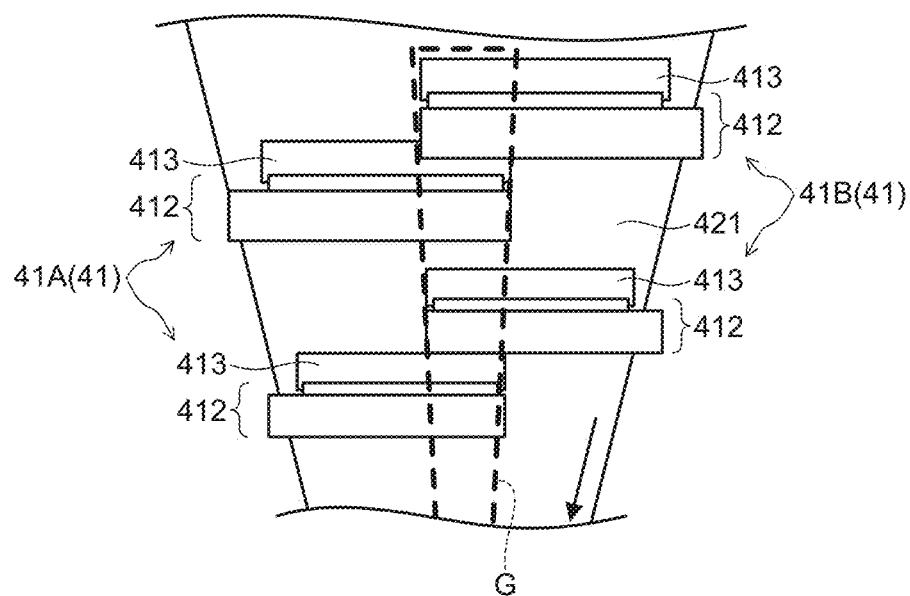
FIG. 4 illustrates the plurality of image forming units disposed on an intermediate transfer belt.

To be specific, as illustrated in FIGS. 3 and 4, image forming unit 41A on the front side and image forming unit 41B on the depth side both corresponding to the same color are disposed adjacent to each other in the conveyance direction (direction indicated by an arrow) of intermediate transfer belt 421. Image forming unit 41A on the front side and image forming unit 41B on the depth side both corresponding to the same color correspond to the "plurality of image forming units" of the present invention.

The plurality of image forming units 41 arranged in the main scanning direction which is the width direction of sheet S are disposed such that image forming units 41 mutually overlap in the main scanning direction. In other words, the plurality of image forming units 41 are disposed in such a manner as to be able to form overlap images which mutually overlap in the main scanning direction of sheet S, and non-overlap images which do not mutually overlap. With this arrangement, the plurality of image forming units 41 superimpose the overlap images and the non-overlap images on each other to form a whole image having a size corresponding to large sheet S.

In addition, as illustrated in FIG. 2, reflection density detection section 73 is disposed in such a manner as to face region G of the overlap images in intermediate transfer belt 421. Reflection density detection section 73 detects the reflection density of a toner image on intermediate transfer belt 421. The detection area of reflection density detection section 73 corresponds to a portion corresponding to the width of the overlap images in the main scanning direction, that is, a portion corresponding to region G in the main scanning direction. In this respect, it is sufficient for the detection area of reflection density detection section 73 to be within the width of region G.

Intermediate transfer unit 42 includes intermediate transfer belt 421, primary transfer roller 422, a plurality of support rollers 423, secondary transfer roller 424, belt cleaning device 426, and the like.

Intermediate transfer belt 421 is composed of an endless belt, and is wound under tension around the plurality of support rollers 423 in a loop form. At least one of the plurality of support rollers 423 is composed of a driving roller, and the others are each composed of a driven roller. For example, it is preferable that roller 423A disposed on the downstream side in the belt travelling direction relative to primary transfer roller 422 for the K component be a driving roller. This makes it easier to keep constant the travelling speed of the belt in a primary transfer part. Intermediate transfer belt 421 travels in direction of arrow A at a constant speed by rotation of a driving roller 423A.

Intermediate transfer belt 421 is a conductive and elastic belt and includes at its surface a high-resistance layer. Intermediate transfer belt 421 is driven into rotation with the control signal from control section 101.

Primary transfer rollers 422 are disposed on the inner peripheral surface side of intermediate transfer belt 421 to face photoconductor drums 413 of respective color components. Primary transfer rollers 422 are brought into pressure contact with photoconductor drums 413 with intermediate transfer belt 421 therebetween, whereby a primary transfer nip for transferring a toner image from photoconductor drums 413 to intermediate transfer belt 421 is formed. The primary transfer nip corresponds to the "transfer nip" of the present invention.

Secondary transfer roller 424 is disposed to face backup roller 423B disposed on the downstream side in the belt travelling direction relative to driving roller 423A, at a position on the outer peripheral surface side of intermediate transfer belt 421. Secondary transfer roller 424 is brought into pressure contact with backup roller 423B with intermediate transfer belt 421 therebetween, whereby a secondary transfer nip for transferring a toner image from intermediate transfer belt 421 to sheet S is formed.

When intermediate transfer belt 421 passes through the primary transfer nip, the toner images on photoconductor drums 413 are sequentially primary-transferred to intermediate transfer belt 421. To be more specific, a primary transfer bias is applied to primary transfer rollers 422, and an electric charge of the polarity opposite to the polarity of the toner is applied to the rear surface side, that is, a side of intermediate transfer belt 421 that makes contact with primary transfer rollers 422 whereby the toner image is electrostatically transferred to intermediate transfer belt 421.

Thereafter, when sheet S passes through the secondary transfer nip, the toner image on intermediate transfer belt 421 is secondary-transferred to sheet S. To be more specific, a secondary transfer bias is applied to secondary transfer roller 424, and an electric charge of the polarity opposite to the polarity of the toner is applied to the rear surface side of sheet S, that is, a side of sheet S that makes contact with secondary transfer roller 424 whereby the toner image is electrostatically transferred to sheet S. Sheet S to which the toner image has been transferred is conveyed towards fixing section 60.

Belt cleaning device 426 removes transfer residual toner which remains on the surface of intermediate transfer belt 421 after a secondary transfer.

Fixing section 60 includes upper fixing section 60A having a fixing-surface-side member disposed on a fixing surface side of sheet S, that is, on a side of the surface of sheet S on which a toner image is formed, lower fixing section 60B having a rear-surface-side supporting member disposed on the rear surface side of sheet S, that is, on a side of the surface of sheet S opposite to the fixing surface, and the like. The rear-surface-side supporting member is brought into pressure contact with the fixing-surface-side member, whereby a fixing nip for conveying sheet S in a tightly sandwiching manner is formed.

At the fixing nip, fixing section 60 applies heat and pressure to sheet S on which a toner image has been secondary-transferred and which has been conveyed to the fixing nip, so as to fix the toner image on sheet S. Fixing section 60 is disposed as a unit in fixing device F.

Upper fixing section 60A includes endless fixing belt 61, heating roller 62 and fixing roller 63, which serve as the fixing-surface-side member. Fixing belt 61 is wound around heating roller 62 and fixing roller 63 under tension.

Lower fixing section 60B includes pressure roller 64 that is the rear-surface-side supporting member. Together with fixing belt 61, pressure roller 64 forms a fixing nip for conveying sheet S in a sandwiching manner.

Sheet conveyance section 50 includes sheet feeder 51, sheet ejection section 52, conveyance path section 53 and the like. Three sheet feeding tray units 51a to 51c, which constitute sheet feeding section 51, store sheets S classified based on basis weight, size, or the like (standard paper, special paper) in accordance with predetermined types. Conveying path section 53 includes a plurality of conveying roller pairs including registration roller pairs 53a. The resist roller section in which resist roller pairs 53a are provided corrects skew and deviation of sheet S.

Sheets S stored in sheet feeding tray units 51a to 51c are sent out one by one from the top one and conveyed to image forming section 40 through conveying path section 53. In image forming section 40, the toner image on intermediate transfer belt 421 is secondary-transferred to one side of sheet S at one time, and a fixing process is performed in fixing section 60. Sheet S on which an image has been formed is ejected out of the image forming apparatus by sheet ejection section 52 including sheet ejection rollers 52a.

In such image forming apparatus 1, when sheets larger in size than a sheet of SRA3 size, for example, are used for printing, and when image forming units 41 are adjusted to the size of sheet S, distortion in parts in image forming units 41 increases, so that image defects, such as density unevenness and the like, tend to occur easily. In addition, it may be even impossible to produce parts having a width corresponding to large sheet S depending on a material and/or a production method employed for parts of the image forming unit.

According to the present embodiment, a plurality of image forming units 41 are arranged in the main scanning direction, so that distortion in the parts in image forming units 41 can be reduced. There are, however, an overlap image formed by image forming unit 41A on the front side and an overlap image formed by image forming unit 41B on the depth side, and there may therefore be differences in image between the overlap images and the non-overlap images.

This is, for example, because image forming unit 41A on the front side and image forming unit 41B on the depth side vary from each other in charge amount of the developing agent, thereby causing a difference in density between images formed by respective image forming units 41.

Accordingly, in the present embodiment, control section 101 controls the plurality of image forming units 41 such that the overlap images are each formed as an image blurred by screen processing, thereby reducing the differences in image at the boundaries between the overlap images and the non-overlap images in the whole image. In this way, the differences in image at the boundaries between the overlap images and the non-overlap images can be made inconspicuous in the whole image. Hereinafter, specific control is described.

Figure 5A:
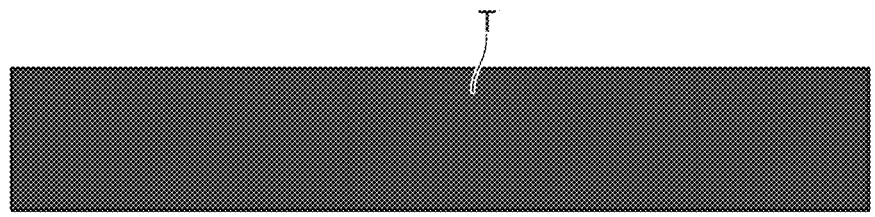
FIG. 5A illustrates an input image.

Control section 101 controls each image forming unit 41 such that the gradation value of each of the images gradually decreases from the boundary between the overlap image and a corresponding one of the non-overlap images towards an end of the overlap image opposite to the non-overlap image. By way of example, descriptions are given for input image T as illustrated in FIG. 5A. Input image T illustrated in FIG. 5A is an image whose gradation value is to be 100% at all the positions along the main scanning direction.

Figure 5B:
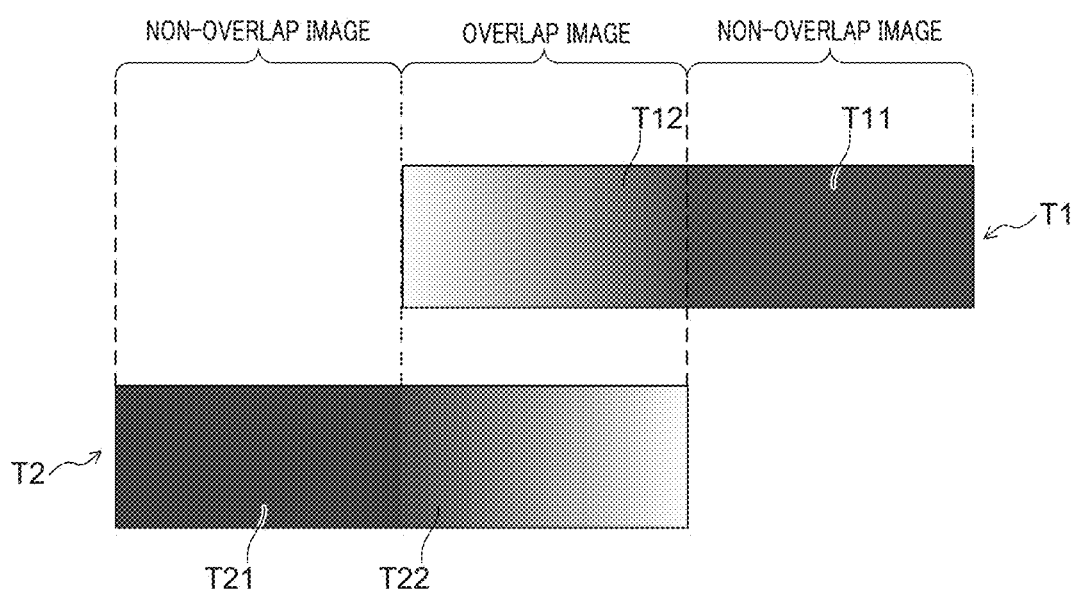
FIG. 5B illustrates the first and the second images to be formed by respective image forming units.

As illustrated in FIG. 5B, control section 101 causes the same image as input image T illustrated in FIG. 5A to be formed as non-overlap image T11 in first image T1 that is to be formed by image forming unit 41B on the depth side. In addition, control section 101 controls the plurality of image forming units 41 such that, in the overlap image, the gradation value of the overlap image continuously decreases from the boundary between non-overlap image T11 and the overlap image towards the end of the overlap image.

To be specific, control section 101 causes the gradation value of each of the overlap images to change from 100% to 0% gradually from the boundary between the non-overlap image and a corresponding one of the overlap images towards the end of the overlap image. That is, the gradation value in overlap image T12 continuously decreases from right to left.

Control section 101 causes the same image as input image T illustrated in FIG. 5A to be formed in non-overlap image T21 in second image T2 to be formed by image forming unit 41A on the front side, in the same manner as in non-overlap image T11. In addition, control section 101 controls the image forming units 41 such that, in the overlap image, the gradation value of the image continuously decreases from the boundary between the non-overlap image and the overlap image towards the end of the overlap image. That is, the gradation value in overlap image T22 continuously decreases from left to right.

Figure 5C:
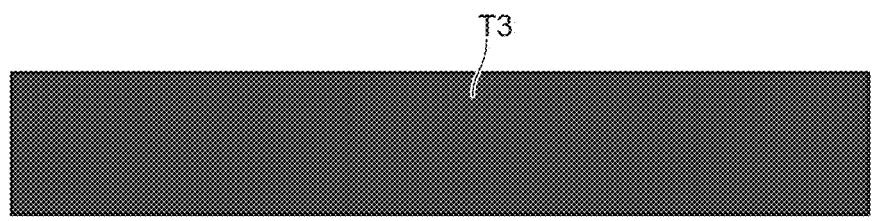
FIG. 5C illustrates a whole image to be output.

Control section 101 also controls image forming units 41 such that the gradation value of the overlap images in whole image T3 in which first and second images T1 and T2 are superimposed is 100% at each position along the main scanning direction. In this way, as illustrated in FIG. 5C, the differences in image at the boundaries between the overlap images and the non-overlap images can be reduced in whole image T3.

Figure 6:
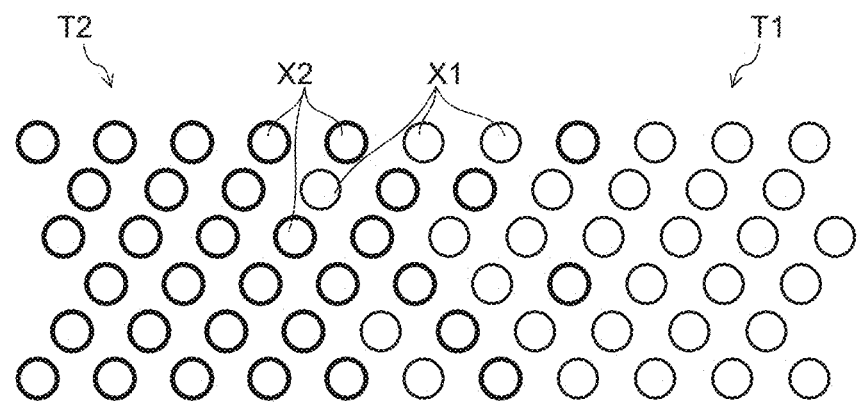
FIG. 6 illustrates an example of image formation processing of overlap images.

Next, image formation processing of forming each of the overlap images as a blurred image is described. As illustrated in FIG. 6, control section 101 controls such that first image T1 formed by one image forming unit, arranged on one side, of two image forming units 41 configured to form the overlap images is formed as an image in which first dots X1 of the overlap image are partly thinned. In addition, control section 101 controls such that second image T2 formed by image forming unit 41 on the other side is formed as an image in which second dots X2 of the overlap image are to be formed in portions of first image T1 where first dots X1 are thinned. In this way, the gradation value of whole image T3 can be 100% entirely along the main scanning direction.

Figure 7:
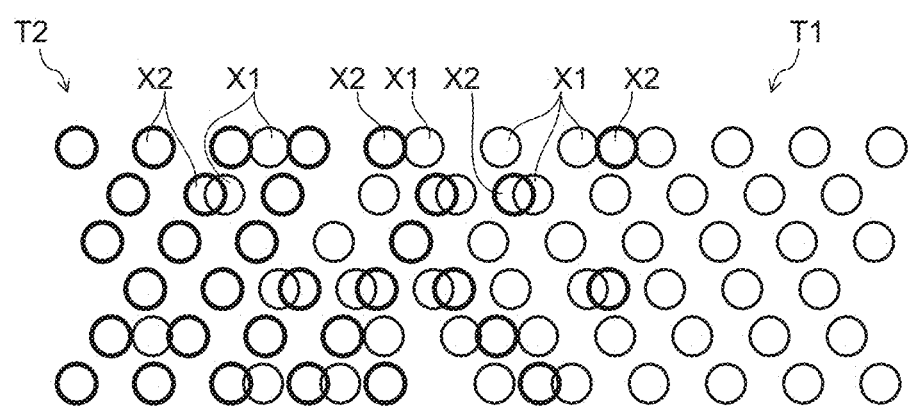
FIG. 7 illustrates an example of image formation processing of overlap images.

Alternatively, control section 101 may carry out control in which the overlap images are formed as images in which dots are thinned at random in the screen processing. To be specific, the gradation value of first dots X1 in first image T1 and the gradation value of second dots X2 in second image T2 are changed based on a Gaussian distribution or a cosine wave as illustrated in FIG. 7. In this way, although the gradation value of the overlap images thus overlapped cannot be 100%, this gradation value of the overlap images can be a value sufficient to make generally inconspicuous the boundaries between the overlap images and the non-overlap images. The image formation processing as illustrated in FIG. 6 is, however, more desirable in consideration that the gradation value of the overlap images varies slightly in the main scanning direction.

Figure 8:
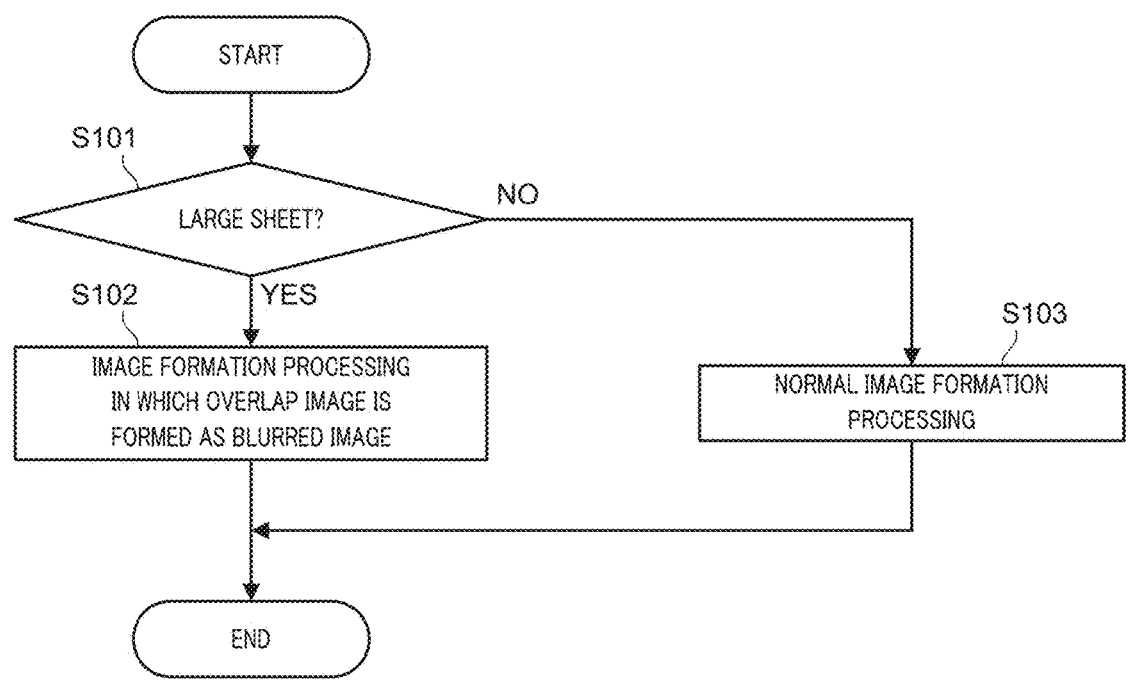
FIG. 8 is a flow chart illustrating an example of control operation in the image forming apparatus.

Next, an example of control operation in image forming apparatus 1 is described. FIG. 8 is a flow chart illustrating an example of control operation in image forming apparatus 1. The processes in FIG. 8 are appropriately performed in a printing job.

As illustrated in FIG. 8, control section 101 determines whether or not image formation processing is being performed on large sheet S (step S101). When the determination result indicates that the image formation processing is being performed on large sheet S (step S101, YES), control section 101 performs image formation processing of forming each of overlap images as an blurred image (step S102).

In contrast, when the image formation processing is not being performed on large sheet S (step S101, NO), control section 101 performs a normal image formation processing using either one of image forming units 41 on the near and depth sides (step S103). The present control is ended after steps S102 and S103.

According to the present embodiment configured as above, in the case of printing on large sheet S, the differences in image at the boundaries between the overlap images and the non-overlap images can be reduced in the whole image formed by the plurality of image forming units 41. Accordingly, it is possible to form, on a large sheet using the plurality of image forming units 41, an image which does not give a user an unnatural impression.

The boundaries between the overlap images and the non-overlap images are made inconspicuous in the whole image, so that it is also possible to reduce the occurrence of a difference in glossiness and of a density difference accompanying with the difference in glossiness near the boundaries. In addition, it is consequently possible to reduce the occurrence of conveyance failure of sheet S and/or of wrinkles in sheet S at fixing section 60.

In addition, the plurality of image forming units 41 corresponding to the same color are disposed adjacently in the conveyance direction of sheet S, so that it can be easier to superimpose toner images on each other to form the a whole image, and therefore, the optimal coloration of the whole image can be achieved.

In addition, the gradation value of each of the overlap images decreases from the boundary between the overlap image and a corresponding one of the non-overlap images towards end of the overlap image, so that it is possible to prevent increases in the gradation values of image portions corresponding to the ends when both of the overlap images are superimposed. It is thus possible to make the boundaries between the overlap images and the non-overlap images more inconspicuous.

In addition, second dots X2 of second image T2 are formed in the portions of first image T1 where first dots X1 are thinned, so that it is possible to prevent overlapping of dots in screen processing of the overlap images. It is thus possible to make the boundaries between the overlap images and the non-overlap images more inconspicuous.

In addition, the detection area of reflection density detection section 73 corresponds to a portion corresponding to the width of the overlap images in the main scanning direction, so that when overlap images are formed, the reflection density in the overlap images can be detected, and when an image is formed by only one of image forming units 41, the reflection density at the position of this image forming unit 41 can be detected. Accordingly, it is possible to carry out density correction of an output density, such as γ adjustment, in each case, so that a difference in reflection density arising in the main scanning direction can be reduced.

In the meanwhile, as for image forming unit 41A on the front side and image forming unit 41B on the depth side, although image forming units 41A and 41B corresponding to the same color are adjacent to each other in the conveyance direction of intermediate transfer belt 421 in the above-mentioned embodiment, the present invention is not limited to this embodiment. For example, image forming units 41 corresponding to different colors may be adjacent to each other in the conveyance direction. It is to be noted, however, that it is desirable, from a viewpoint of ease of superimposing images, that image forming units 41 corresponding to the same color is adjacent to each other in the conveyance direction.

In addition, although the image formation on large sheet S is performed by arranging image forming units 41 in the main scanning direction in the above-mentioned embodiment, the present invention is not limited to this embodiment.

Figure 10:
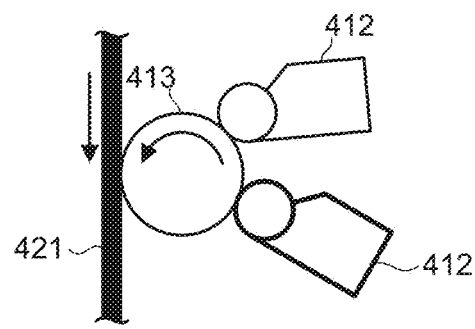
FIG. 10 illustrates a modification in which two developing devices are provided for one photoconductor drum.

For example, as illustrated in FIG. 10, a configuration may also be adopted in which two developing devices 412 are arranged with respect to photoconductor drum 413 corresponding to large sheet S. In this configuration, upper developing device 412 in the figure is developing device 412 on the depth side, and lower developing device 412 in the figure is developing device 412 on the front side. With this configuration, images are superimposed on photoconductor drum 413, thereby enabling image formation processing applicable to large sheet S.

Figure 11:
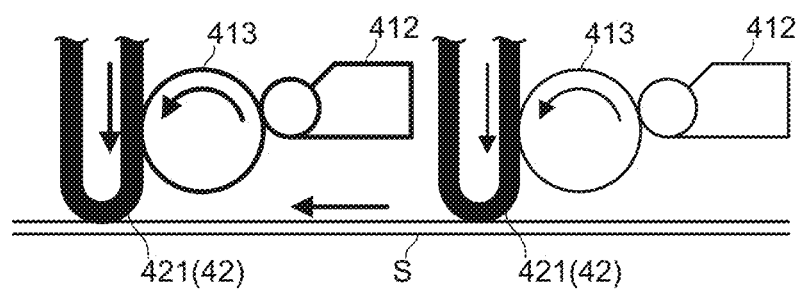
FIG. 11 illustrates a modification in which two intermediate transfer units are provided.

In addition, as illustrated in FIG. 11 for example, a configuration may also be adopted in which two intermediate transfer units 42 are provided. In this configuration, intermediate transfer unit 42 located upstream in the conveyance direction of sheet S corresponds to image forming unit 41B on the depth side, and intermediate transfer unit 42 located downstream in the conveyance direction of sheet S corresponds to image forming unit 41A on the front side. With this configuration, images are superimposed on sheet S, thereby enabling image formation processing applicable to large sheet S.

In addition, although image forming apparatus 1 capable of forming a color image is illustrated in the above-mentioned embodiment, the present invention is not limited to this embodiment, and may be an image forming apparatus only capable of forming a monochrome image.

In addition, the aforementioned embodiments merely describe examples of implementations for practicing the present invention, and should not be construed as limiting the technical scope of the present invention. That is, the present invention can be embodied in various forms without departing from the spirit, scope, or principal features of the present invention.

The present invention is applicable to the image forming system composed of a plurality of units including an image forming apparatus. A plurality of units include external apparatus, such as a post-processing apparatus, a control apparatus connected through a network, and the like.

Figure 12:
FIG. 12 illustrates an image used in an evaluation experiment.

At the end, an evaluation experiment of image forming apparatus 1 according to the embodiment is described. As an image to be evaluated, an image as illustrated in FIG. 12 was used. This image was formed, and then evaluated as to whether or not differences in image are conspicuous at boundaries between non-overlap images and overlap images (that is, a portion where an image formation region on the front side and an image formation region on the depth side are superimposed on each other).

Figure 9:
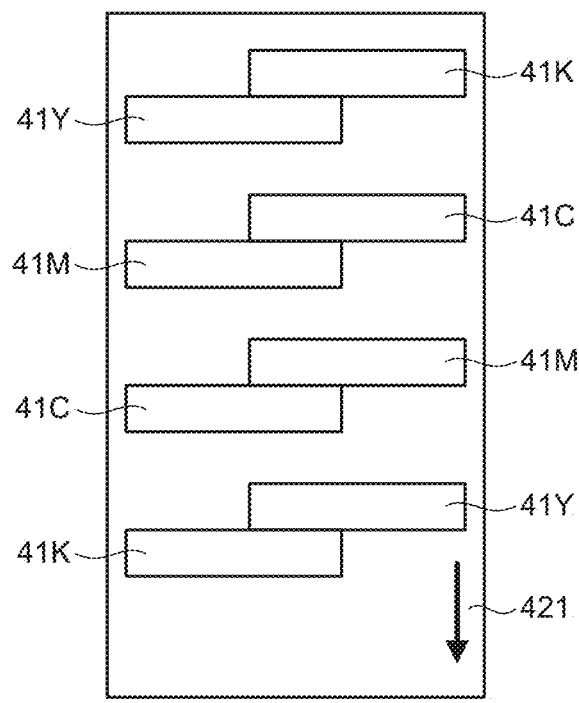
FIG. 9 illustrates a modification in which the arrangement of the image forming units in the conveyance direction is modified.

It is to be noted that this experiment was performed using image forming apparatus 1 illustrated in FIG. 1, an example where processing illustrated in FIG. 6 is carried out is referred to as example 1, and an example where processing illustrated in FIG. 7 is carried out is referred to as example 2. In addition, an example where the arrangement of image forming units 41 as illustrated in FIG. 9 is adopted is referred to as example 3.

Figure 13:
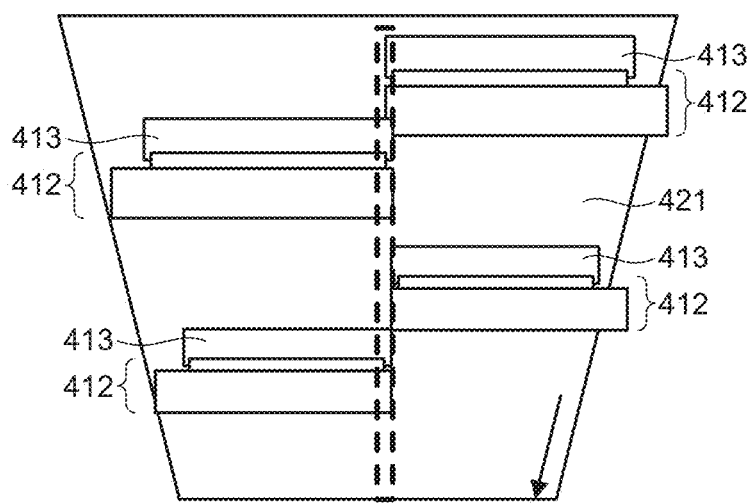
FIG. 13 illustrates a plurality of image forming units according to a comparative example.

A configuration is employed as a comparative example, in which, as illustrated in FIG. 13, overlap images are not formed between image forming unit 41A on the front side and image forming unit 41B on the depth side when images are superimposed. The evaluation result in the present experiment is shown in table 1.

TABLE 1

| Example 1 | Example 2 | Example 3 | Comparative Example |
|---|---|---|---|
| Good | Good | Good | Poor |

In table 1, "Good" indicates that visual inspection of an output image confirmed that differences in image are not conspicuous at the boundaries between overlap images and non-overlap images, and "Poor" indicates that visual inspection of an output image confirmed that differences in image are conspicuous at the boundaries between overlap images and non-overlap images.

As indicated in table 1, the differences in image were confirmed to be conspicuous at the boundaries between the overlap images and the non-overlap images in the comparative example, but the differences in image were confirmed to be inconspicuous at the boundaries between the overlap images and the non-overlap images in all examples 1 to 3. This means that the effectiveness of the control in the present embodiment was confirmed.

Next, evaluation was made as to whether or not a difference in image is conspicuous between the non-overlap images formed by image forming units 41A and 41B on the near and depth sides. This experiment was performed for examples 1 to 3 in the experiment in table 1.

In this experiment, the difference in image between the non-overlap images was confirmed to be inconspicuous in examples 1 and 2, but the difference in image between the non-overlap images in example 3 was confirmed to be somehow conspicuous compared to the differences in examples 1 and 2. To be specific, coloring of K was clearly stronger in the image formation region on the depth side than in the image formation region on the front side. This result indicates that a difference in image occurred between the non-overlap images. This result confirmed that the configuration in which image forming units 41 corresponding to the same color are adjacent to each other in the conveyance direction is superior to the configuration in which image forming units 41 corresponding to the same color are not adjacent to each other in the conveyance direction.

Although embodiments of the present invention have been described and illustrated in detail, it is clearly understood that the same is by way of illustration and example only and not limitation, the scope of the present invention should be interpreted by terms of the appended claims.

What is claimed is:

1. An image forming apparatus comprising:
a plurality of image formers each capable of forming, on a sheet, an overlap image to be overlapped with another overlap image, and a non-overlap image not to be overlapped with another non-overlap image in a main scanning direction that is a width direction of the sheet;
a fixer that fixes, on the sheet, a whole image composed of the overlap images and the non-overlap images formed by the plurality of image formers; and
a hardware processor that controls the plurality of image formers such that differences in images at boundaries between the overlap images and the non-overlap images are reduced in the whole image,
wherein the hardware processor performs control in which the overlap images are each formed as an image in which dots are thinned at random in screen processing, and the hardware processor changes the gradation value of each of the overlap images based on a cosine wave.

2. The image forming apparatus according to claim 1, wherein:
the hardware processor performs control in which the each of the overlap images is blurred by screen processing.

3. The image forming apparatus according to claim 2, wherein:
the plurality of image formers are provided in such a manner as to correspond to each of a plurality of colors of developing agents, and
the plurality of image formers corresponding to the same color are disposed adjacent o each other in a conveyance direction of the sheet.

4. The image forming apparatus according to claim 2, wherein:
the hardware processor controls the plurality of image formers such that a gradation value of each of the images gradually decreases from the boundary between the overlap image and a corresponding one of the non-overlap images towards an end of the overlap image opposite to the boundary.

5. The image forming apparatus according to claim 4, wherein:
the hardware processor controls the plurality of image formers such that the gradation value of each of the images in the overlap images is changed from 100% to 0% gradually from the boundary towards the end of the overlap image.

6. The image forming apparatus according to claim 4, wherein:

the hardware processor controls the plurality of image formers such that a gradation value of the overlap images thus overlapped in the whole image is 100% at each position along the main scanning direction.

7. The image forming apparatus according to claim 2, wherein:
the hardware processor performs control in which a first image formed by one image former of two of the plurality of image formers that form the overlap images is formed as an image in which first dots of the overlap image are partly thinned, and a second image formed by the other image former is formed as an image including second dots to be formed in portions of the first image where the first dots are thinned, the one image former being located on one side, the other image former being located on the other side.

8. The image forming apparatus according to claim 1, further comprising:
a reflection density detector that detects a reflection density of a toner image in a region of the overlap images, among toner images to be formed by the plurality of image formers.

9. The image forming apparatus according to claim 8, wherein:
a detection area for which the reflection density detector is to detect the reflection density is within a width of the overlap images in the main scanning direction.

10. The image forming apparatus according to claim 1, wherein:
each of the plurality of image formers includes:
an exposer that forms an electrostatic latent image on an image bearing member; and
a developer that makes toner adhere to the electrostatic latent image formed on the image bearing member so as to form a toner image.

11. The image forming apparatus according to claim 10, wherein:
each of the plurality of image formers includes the image bearing member.

12. The image forming apparatus according to claim 10, further comprising:
a transferrer that forms a transfer nip between the transferrer and the image bearing member and that corresponds to each of the plurality of image formers.

13. A non-transitory recording medium storing therein a computer-readable program for an image forming apparatus including a plurality of image formers each capable of forming, on a sheet, an overlap image to be overlapped with another overlap image, and a non-overlap image not to be overlapped with another non-overlap image in a main scanning direction that is a width direction of the sheet; and a fixer that fixes, on the sheet, a whole image composed of the overlap images and the non-overlap images formed by the plurality of image formers, wherein
the program causes a computer in the image forming apparatus to carry out control processing of controlling the plurality of image formers such that differences in images at boundaries between the overlap images and the non-overlap images are reduced in the whole image, and
the program causes the computer in the image forming, apparatus to carry out control in which the overlap images are each formed as an image in which dots are thinned at random in screen processing, and the hardware processor changes the gradation value of each of the overlap images based on a cosine wave.

14. The recording medium according to claim 13, wherein:
the program causes the computer in the image forming apparatus to carry out control processing in which the each of the overlap images is blurred by screen processing.

15. The recording medium according to claim 14, wherein:
the plurality of image formers are provided in such a manner as to correspond to each of a plurality of colors of developing agents, and
the plurality of image formers corresponding to the same color are disposed adjacent to each other in a conveyance direction of the sheet.

16. The recording medium according to claim 14, wherein:
the program causes the computer in the image forming apparatus to carry out processing of controlling the plurality of image formers such that a gradation value of each of the images gradually decreases from the boundary between the overlap image and a corresponding one of the non-overlap images towards an end of the overlap image opposite to the boundary.

17. The recording medium according to claim 16, wherein:
the program causes the computer in the image forming apparatus to carry out processing of controlling the plurality of image formers such that the gradation value of each of the images in the overlap images is changed from 100% to 0% gradually from the boundary towards the end of the overlap image.

* * * * *